June 4, 1963 W. D. DALTON ETAL 3,092,772

CONTROL FOR NOISE SQUELCH CIRCUIT

Filed June 7, 1960 2 Sheets-Sheet 1

INVENTORS
WAYNE A. DALTON
ARCHIE A. McGEE, JR.

BY Isidore Match

ATTORNEY

CONTROL FOR NOISE SQUELCH CIRCUIT

Filed June 7, 1960 2 Sheets-Sheet 2

INVENTORS
WAYNE A. DALTON
ARCHIE A. Mc GEE, JR
BY Isidore Match
ATTORNEY

United States Patent Office 3,092,772

Patented June 4, 1963

3,092,772

CONTROL FOR NOISE SQUELCH CIRCUIT

Wayne D. Dalton and Archie A. McGee, Jr., Lynchburg, Va., assignors to General Electric Company, a corporation of New York Filed June 7, 1960, Ser. No. 34,396
3 Claims. (Cl. 325—319)

This invention relates to noise squelch circuits. More particularly, it relates to noise squelch circuits including means for automatically over-riding the noise squelch operation of such circuit.

In known noise squelch circuits in a radio receiver, it is the usual practice to obtain a noise squelch signal from the noise present at the detector of a receiver in an amplitude modulation system or the noise present at the limiter or discriminator of a receiver in a frequency modulation system at a time that no audio signal is being received. Such noise at the detector or limiter is rectified and the rectified signal is applied as a unidirectional potential bias to render the active device in the audio amplifying stage of the receiver nonconductive. In many situations, it may first be desirable to amplify the rectified noise signal prior to its application as such bias.

When an audio signal is received, the level of the noise squelch signal is appreciably diminished whereby the active device in the audio amplifier stage of the receiver is not consequently rendered nonconductive thereby. The output of the noise amplifier thus serves to provide noise squelch when the receiver is not receiving, i.e., when it is in the "signal off" condition.

In known systems such as selective signaling (selective calling) and continuous tone coded squelch systems, it is necessary, for monitoring purposes, to actuate the noise amplifier so that it functions in a similar manner as when the noise signal is applied thereto, i.e., to provide noise squelch. Such function, however, is effected by the receipt of a tone signal and not the noise signal picked up at the limiter or at the detector. To provide the latter effect, the normal practice has been to provide a biasing voltage to actuate the noise amplifier through a toggle switch or through relay contacts in series with a tone actuated circuit. Such bias in this situation is generally provided to the noise amplifier by the manual manipulation of a switch by an operator, i.e., his closing or opening the switch depending upon the circuit arrangement which is chosen. This technique of providing the bias to the amplifier presents the disadvantage that it is not automatic since the intervention of the operator is required.

Where automatic monitoring is included in known squelch circuits, there is generally utilized either a device such as a microphone hookswitch associated with a relay, or a pair of diodes, a pair of active devices, and a relay. If only the combination of a hookswitch and a relay are utilized for this purpose, the relay connections must be adapted each time to the ground polarity of the system in which the squelch control circuit is installed, i.e., the connections of the relay must be reversed in a negative ground system from their arrangement in a positive ground system. This results in great inconvenience and difficulty in the transferring of a unit from one installation to another. As for the combination of the pair of diodes, two active devices, and the relay, this entails a cost which is entirely out of proportion to the result and convenience which is desired to be achieved.

Accordingly, it is an important object of this invention to provide a noise squelch circuit for a radio receiver including a simple control for rendering the receiver circuit capable of automatically monitoring a chosen channel upon the reception of a given tone signal.

It is another object of the invention to provide a noise squelch circuit in accordance with the preceding object wherein no circuit modifications are necessary when the circuit is transferred from a positive grounded system to a negative grounded system.

It is a further object to provide a noise squelch circuit in accordance with the preceding objects wherein there is required very little power drain by the control.

Generally speaking and in accordance with the invention, there is provided in combination an active device for reproducing an electric signal received thereby and noise squelch means for disabling the active device in the absence of a received signal. A unidirectional potential source comprising a positive and negative terminal is in circuit with the active device and the noise squelch means, one of the terminals being at a reference potential level, i.e., ground. There are provided means responsive to a chosen signal for automatically enabling the noise squelch means, the enabling means comprising means for providing a unidirectional potential to enable the noise squelch means irrespective of whether either the positive or negative terminal is at the reference potential level.

The features of this invention which are believed to be new are set forth with particularity in the appended claims. The invention, itself, may best be understood by reference to the following description when taken in conjunction with the accompanying drawings which disclose embodiments of a circuit accordingly to the invention.

In the drawings, FIG. 1 is a schematic depiction of a noise squelch control circuit;

Figure 1:
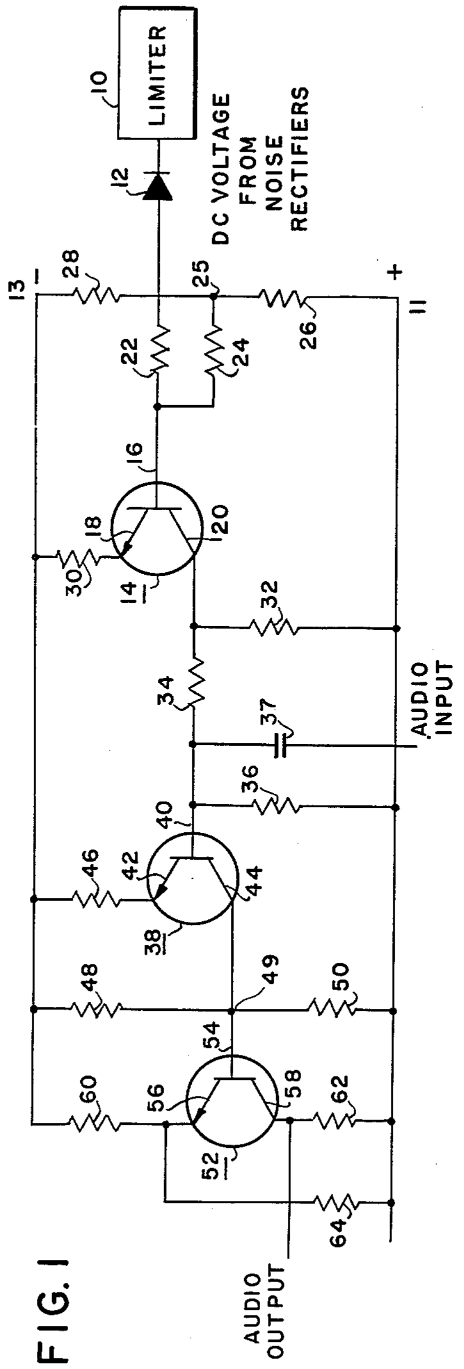

Referring now to FIG. 1, the noise signal which is present at limiter 10 when the circuit is under "no signal" condition is rectified in rectifier 12 to provide a negative unidirectional potential. The latter potential is applied to the base 16 of an NPN type transistor 14 through a resistor 22. Base 16 is connected to the positive terminal 11 of a unidirectional potential source (not shown) through resistors 24 and 26, the junction 25 of resistors 24 and 26 being connected to the negative terminal 13 of the potential source through a resistor 28. The emitter 18 is connected to negative terminal 13 through a resistor 30 and the collector 20 is connected to positive terminal 11 through a resistor 32. The values of the resistors associated with transistor 14 are so chosen that with no rectified noise signal applied to base electrode 16, the transistor is in the conductive state. When the negative noise signal is applied to base 16, transistor 14 is rendered nonconductive whereby the potential rises at collector 20 and is applied to the base electrode 40 of a transistor 38 through a resistor 34.

Transistor 38 is normally biased to saturation conduction because of the connection of base 40 to positive terminal 11 through a resistor 36 and the value chosen for resistor 36. The emitter 42 is connected to negative terminal 13 through a resistor 46 and the collector 44 is connected to the base 54 of a transistor 52 through the junction 49 of resistors 48 and 50 which comprise a potential divider connected between negative terminal 13 and positive terminal 11. Since transistor 38 is normally biased to conduct at saturation, junction point 49 is at a sufficiently negative potential to maintain the audio output transistor 52 at nonconduction, transistor 52 also comprising an emitter 56 connected to negative terminal 13 through a resistor 60 and a collector 58 connected to positive terminal 11 through a resistor 62.

Since transistor 38 is biased to saturation conduction during the quiescent state of the circuit, the rise of potential at base 40 due to the application of the noise signal to base 16 of transistor 14 has substantially no effect on the conductivity of transistor 38 whereby transistor 52 remains at cutoff. In this connection, the bleeder resistor 64 connected between emitter 56 and positive terminal 11 tends to make the normal biasing potential at emitter 56, much less negative than the potential at negative terminal 13 whereby base 54 swings to a potential more negative than emitter 56 to assure the cutoff state of audio output transistor 52 in the "signal off" condition.

When the circuit of FIG. 1 is under "signal conditions," i.e., when there is an appreciably lower noise signal picked up at the limiter or detector stage due to the reception of a signal by the receiver and applied through capacitor 37, the potential at base electrode 16 tends to rise to a potential where transistor 14 is rendered conductive with a consequent fall of potential at collector 20 due to flow of current through resistor 32 and the consequent voltage drop thereacross. This drop in potential at collector 20, applied to base 40, is not sufficient to cause the rendering nonconductive of transistor 38. However, it does reduce the conduction therein from saturation conduction to partial conduction. Accordingly, when transistor 38 is changed from saturation to non-saturation conduction, the audio input applied to base electrode 40 through capacitor 37 will not be limited at its positive portions. The audio output at collector 44 is applied to base 54 and the output is taken from the circuit at collector 58. As explained hereinabove, due to the presence of bleeder resistor 64, the bias at emitter 56 is much less than the supply voltage bias so here again the full swing of the output from collector 38 will be amplified by transistor 52.

Heretofore, if it were desired to monitor a particular channel by a receiver conditioned for reception of signals in such channel, in the receiver containing the circuit of FIG. 1, such monitoring would either be provided by the intervention of an operator who would open a toggle switch, or relay contacts in series with a tone actuated circuit to provide a biasing potential to transistor 14 whereby it would be rendered nonconductive. If it were desired to automatically monitor the channel, there would be utilized in conjunction with the circuit of FIG. 1, a combination of a microphone hookswitch and a relay or a combination of two diodes, two transistors, and a relay. If only the hookswitch and the relay were used, the relay connections would have to be reversed each time the circuit was installed in a system having a given ground polarity.

Figure 2:
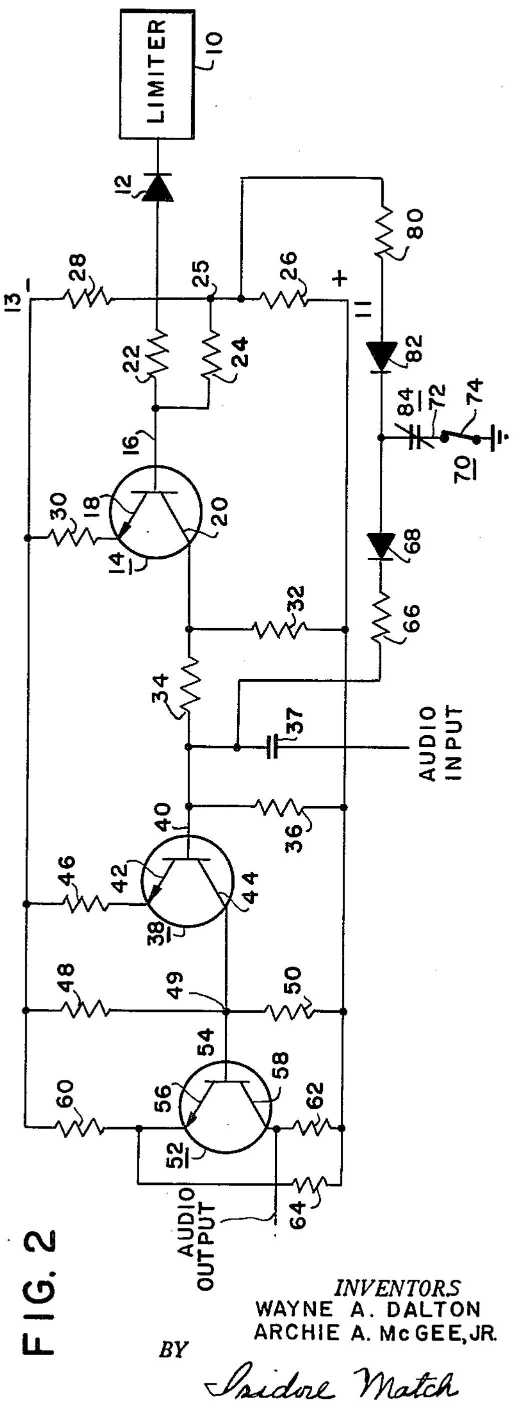
FIG. 2 is a diagram of an arrangement in accordance with the invention which includes the noise squelch circuit of FIG. 1 wherein the noise squelch operation is effected automatically by the reception of a tone signal so that a channel can be automatically monitored.

In the circuit of FIG. 2, there is provided in accordance with the invention a control arrangement associated with the circuit of FIG. 1 whereby the chanel for which the receiver is conditioned to receive can be automatically monitored, the numbers and cost of the components of the control arrangement being at a minimum and whereby no circuit modifications are necessary when the circuit is changed from a positive grounded system to a negative grounded system.

In the circuit of FIG. 2, since the noise squelch portion thereof is the same as that of FIG. 1, the same designating numerals have been utilized for corresponding circuit components therein. In addition, in the circuit of FIG. 2 there is provided a connection to one contact 72 of a hookswitch 70 from junction 25 through a resistor 80, a diode 82, and the normally closed contacts 84 of a relay (not shown), the other contact 74 of a hookswitch being connected to ground. There is also provided a connection to the contact 72 of hookswitch 70 from base 40 through a resistor 66, a diode 68, and normally closed contacts 84.

In the operation of the circuit of FIG. 2, assuming that it is utilized in a negative grounded system, i.e., terminal 13 is at ground, base 16 is connected to ground through resistor 24, resistor 80, diode 82, normally closed contacts 84, and closed hookswitch 70. In such situation, base 16 in the quiescent state cannot rise to a potential greater than ground potential and whereas the potential at emitter 18 does not fall below ground, transistor 14 is at collector current cutoff. The "unsquelching" of the circuit may be affected by lifting the microphone from the hookswitch whereby it opens to disconnect base 16 from ground or by causing the opening of contacts 84 due to the actuation of the relay with which it is associated when the particular tone signal for which the receiver is conditioned is received. (The relay and its circuit connection in tone reception is not shown.) Resistor 80 is utilized to maintain current drain at a minimum.

In a positive grounded system, i.e., where positive terminal 11 is connected to ground, base 40 of transistor 38 is maintained at ground potential whereby transistor 38 conducts at saturation to maintain transistor 52 at collector current cutoff. Resistor 66 like resistor 80 is included to maintain current drain at a minimum.

In the negative grounded connection situation, it is seen that base 40 is maintained at a relatively high positive potential due to the poling of diode 68 and in the positive grounded situation, base 18 is maintained at a relatively high negative potential due to the poling of diode 82.

Figure 3:
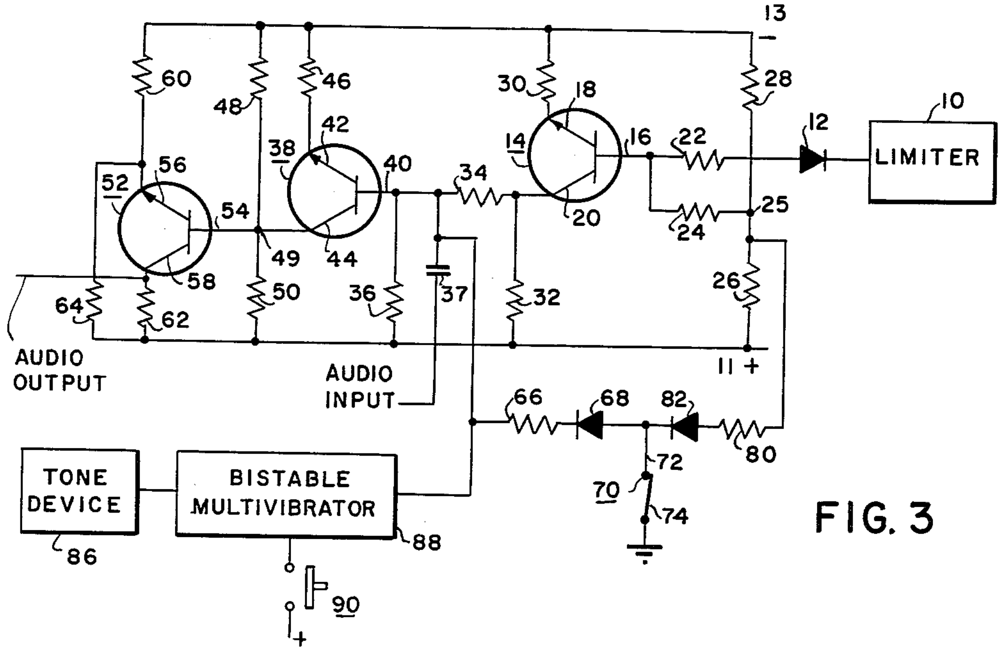
FIG. 3 is a schematic depiction of an arrangement similar to that of FIG. 2 and utilizable in pulsed tone systems.

The circuit depicted in FIG. 3 is similar to that of FIG. 2 except that normally closed contacts 84 associated with the relay of the tone receiving equipment is not included. Also in the circuit of FIG. 3 which may be utilized in a pulsed tone system, a tone actuated device 86 which may be of the known resonant reed relay type, for example, triggers a bistable multivibrator 88. In this arrangement, to maintain the squelched condition of the circuit, the output of multivibrator 88 is normally positive during the quiescent state. When a tone is received to switch the conductivity state of the multivibrator, a negative biasing potential is applied to base 40 whereby transistor 38 is changed from saturation conduction to partial conduction and transistor 52 consequently is rendered conductive. To reestablish the squelched condition in the circuit, a simple push botton 90 may be utilized to provide a positive input to multivibrator 88 whereby its conductivity state is reswitched to that of its normal quiescent state.

Figure 4:
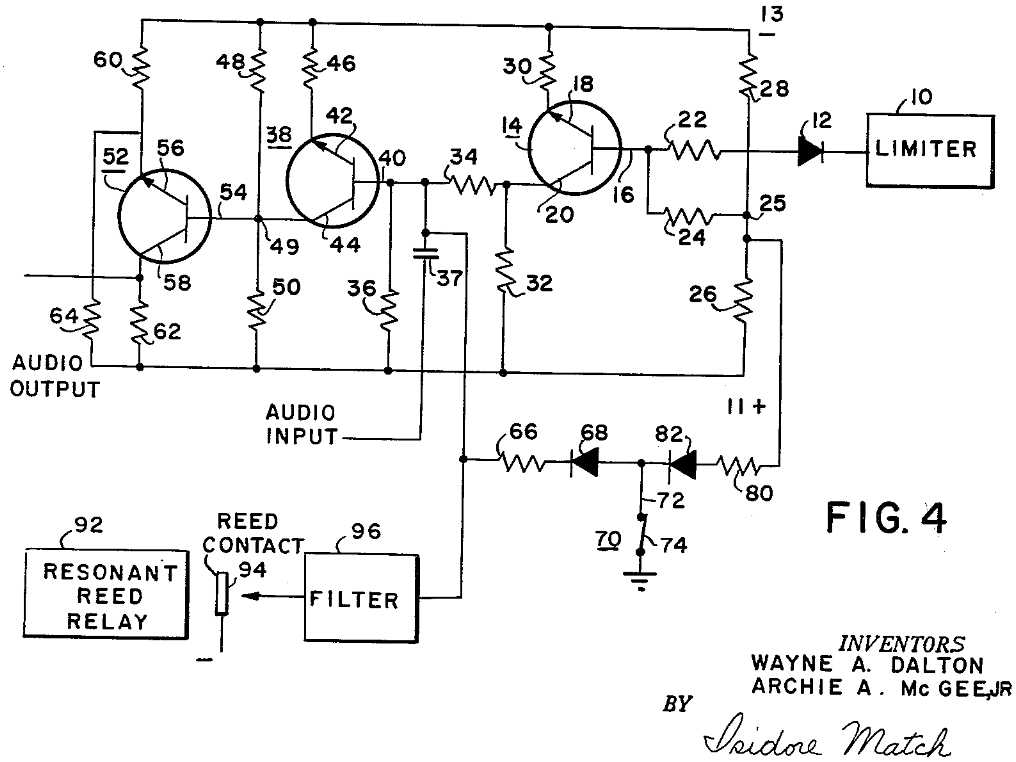
FIG. 4 is a schematic diagram of an arrangement similar to FIG. 2 which may be utilized in continuous tone systems.

The circuit of FIG. 4 depicts an arrangement similar to that of FIG. 3 but wherein the tone actuated device 86 and the bistable multivibrator 88 are replaced by a resonant reed relay 92 with its associated contacts 94 and a filter 96. In this circuit, which is adaptable for use in a continuous tone system, the output of the reed relay is filtered and used directly to establish a negative biasing potential at base 40 which counteracts the effect of the bias provided through resistor 66, diode 68 and hookswitch 70 in the positive grounded system or resistor 80, diode 82, and hookswitch 70 in the negative grounded system. It is seen in FIG. 4 that the contacts 94 associated with resonant reed relay 92 are connected to a negative potential source.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed and desired to be secured by Letters Patent of the United States is:

1. In a radio receiver including an active audio output stage, noise squelch means for maintaining said audio stage substantially at cutoff during the quiescent state of said receiver, a source of unidirectional potential having a positive and a negative terminal in circuit with said noise squelch means and said audio stage, one of said terminals being at ground potential, and means in circuit with said noise squelch means, said audio stage and said source for automatically selectively disabling said noise squelch means or enabling said audio stage in response to the reception of a chosen electrical signal, said last named means including means for activating said noise squelch means in the absence of said chosen signal to maintain said receiver quiescent whenever one of said terminals is at ground potential, and means for directly disabling said audio stage in the absence of said chosen signal when the other of said terminals is at ground potential, means to disable said means for activating and said means for disabling upon receipt of said chosen signal to condition said input receiver for reproduction of a transmitted signal.

2. In a radio receiver, an audio stage including a transistor, noise squelch means including a transistor in circuit with said audio stage for maintaining said audio stage transistor at cutoff when said receiver is in the quiescent state, a source of unidirectional potential having a positive and a negative terminal in circuit with said transistors for providing operating biasing potentials thereto, one of said terminals being at ground potential, means in circuit with said noise squelch transistor, said audio transistor and said source for automatically applying a biasing potential to said noise squelch transistor in the absence of a chosen signal including first control means to activate said noise squelch means and maintain said receiver quiescent when one of said terminals is at ground potential and second control means for plying a biasing potential to said audio transistor in the absence of said signal to disable said audio transistor and maintain said receiver quiescent when the other of said terminals is at ground potential, and means to disable said first and second control means upon receipt of said chosen signal to thereby condition said receiver for receiving and reproducing a transmitted signal.

3. In a radio receiver of the type including an audio output stage and squelch circuit means for said audio output stage, the combination comprising a source of unidirectional potential having a positive and negative terminal, one of said terminals being utilized as a point of reference potential, and control means in circuit with said source and said audio and squelch means for alternately activating said squelch circuit means or disabling said audio means in the absence of a chosen signal to maintain said receiver quiescent, said control means being operative to alternately activate said squelch circuit or disable said audio directly in accordance with the terminal maintained at the reference potential whereby said receiver is conditioned to reproduce a transmitted signal irrespective of the terminal maintained at said reference potential.

References Cited in the file of this patent

UNITED STATES PATENTS

| | | |
|---|---|---|
| 2,596,138 | Feiner et al. | May 13, 1952 |
| 2,743,361 | Bauman | Apr. 24, 1956 |
| 2,840,699 | Carpenter | June 24, 1958 |
| 2,904,678 | Malchow | Sept. 15, 1959 |
| 2,926,241 | Goldman | Feb. 23, 1960 |
| 2,930,890 | Lenk | Mar. 29, 1960 |